United States Patent
Cooke et al.

(10) Patent No.: US 9,767,446 B2
(45) Date of Patent: Sep. 19, 2017

(54) TOUCH SCREEN SYSTEM AND METHODS FOR MULTIPLE CONTACTLESS PAYMENTS

(75) Inventors: Alan Cooke, Dublin (IE); Stephen Elder, Dublin (IL); Simon Blythe, Cambridgeshire (GB)

(73) Assignee: MasterCard International Incorporated, Purchase, NY (US)

( * ) Notice: Subject to any disclaimer, the term of this patent is extended or adjusted under 35 U.S.C. 154(b) by 378 days.

(21) Appl. No.: 13/553,398

(22) Filed: Jul. 19, 2012

(65) Prior Publication Data

US 2014/0025513 A1    Jan. 23, 2014

(51) Int. Cl.
G06Q 20/20    (2012.01)
G06Q 20/32    (2012.01)
G06Q 20/34    (2012.01)
G06Q 20/10    (2012.01)

(52) U.S. Cl.
CPC ............ *G06Q 20/20* (2013.01); *G06Q 20/10* (2013.01); *G06Q 20/3278* (2013.01); *G06Q 20/352* (2013.01)

(58) Field of Classification Search
CPC .................... G06Q 20/20; G06Q 20/10; G06F 2203/04104; G06F 1/3231; G06F 9/543
USPC .................................. 705/754, 759; 345/173
See application file for complete search history.

(56) References Cited

U.S. PATENT DOCUMENTS

| | | | | |
|---|---|---|---|---|
| 7,832,646 B1* | 11/2010 | Leason | ............... | G06Q 20/102 235/492 |
| 8,332,272 B2* | 12/2012 | Fisher | ............... | 705/16 |
| 8,645,840 B2* | 2/2014 | Ellsworth | ............... | 715/747 |
| 8,718,553 B2* | 5/2014 | Parekh | ............... | G06F 1/1643 345/156 |
| 9,250,734 B2* | 2/2016 | Hotelling | ............... | G06F 1/3231 |
| 2005/0043996 A1* | 2/2005 | Silver | ............... | 705/15 |
| 2006/0259390 A1* | 11/2006 | Rosenberger | ............... | G06Q 20/04 705/35 |
| 2008/0158172 A1* | 7/2008 | Hotelling | ............... | G06F 1/3231 345/173 |
| 2010/0194703 A1* | 8/2010 | Fedor et al. | ............... | 345/173 |
| 2011/0010271 A1* | 1/2011 | Black | ............... | G06Q 10/0875 705/27.2 |
| 2012/0075252 A1 | 3/2012 | Dighde et al. | | |
| 2012/0075256 A1* | 3/2012 | Izadi et al. | ............... | 345/175 |

* cited by examiner

*Primary Examiner* — Ryan Zeender
*Assistant Examiner* — Milena Racic
(74) *Attorney, Agent, or Firm* — Buckley, Maschoff & Talwalkar LLC

(57) ABSTRACT

Systems and methods for operating a touch screen for contactless payments are described. In an embodiment, a process includes detecting the presence of multiple proximity payment devices in contact with a touchable surface of a touch screen, displaying a payment option menu for multiple consumers associated with the proximity payment devices, and detecting selection of payment amounts. The process includes reading payment account data from the multiple proximity payment devices, providing the payment account data to a processor, and transmitting the payment account data and the payment amounts associated with the multiple proximity payment devices to a payment server computer. The process may also include receiving one or more payment authorization messages associated with the proximity payment devices, and displaying the payment authorization message(s).

10 Claims, 10 Drawing Sheets

TOUCH SCREEN SYSTEM AND METHODS FOR MULTIPLE CONTACTLESS PAYMENTS

BACKGROUND

There is an emerging trend for businesses to provide new and exciting consumer experiences through the use of surface or multi-touch screen technology. In particular, businesses such as hotels, bars, restaurants and casinos are interested in providing touch screen display tables for use by their customers and/or guests. Companies such as Samsung have developed touch screen display tables with user interfaces that recognize fingers, hands and objects placed on the screen, enabling vision based interaction. The individual pixels in the display "see" what is touching the screen, and that information is processed and interpreted. For example, a multi-touch screen display table may be located in a hotel lobby with several chairs positioned around the table. A hotel guest graphical user interface may be configured to interpret finger touch inputs and then to display photographs of hotel amenities and/or local points of interest when a guest at the hotel presses icons visible on the touch screen surface. Similar touch screens or touch panels are in use and provide user interfaces for devices such as tablet PCs, self-service terminals, and mobile devices such as personal digital assistants (PDAs) and mobile telephones.

A number of different technologies have been developed for touch panel displays. For example, touching the screen of a resistive touch panel causes layers, which are normally separated by a small gap, to come into contact, while touching the screen of a capacitive touch panel changes the capacitance. In another example, a touch screen may utilize optical sensors (e.g. an optical sensor array) to detect when a screen is touched. The use of optical sensors enables multi-touch sensing, which is the detection of multiple simultaneous touches on the same screen. Such optical touch screens typically use a shadow mode of operation and/or a reflective mode of operation. In shadow mode, the sensor detects the shadow cast by an object coming into contact with the screen. The shadow mode of operation is affected by the level of ambient visible lighting such that if the lighting is too dim then there may be no shadow and so the touch screen will fail to detect touch events. In the reflective mode of operation, the touch screen includes a light source that illuminates objects which are brought into contact with the screen and a sensor detects the light reflected back by the objects. In cases wherein the touch screen includes an LCD screen, which allows images to also be displayed on the screen, the image may affect the detection of objects because different color regions will allow different amounts of light to be transmitted through. Such an arrangement may affect the amount of light that reaches the object and thus how much of the reflected light reaches the sensor. In other embodiments, a touch panel utilizes an infrared light source and an array of infrared sensors to detect when objects contact, or are close to, the touchable surface of the panel.

Manufacturers of touch screen tables have promoted them for use in retail settings, such as bars and restaurants, with interfaces that permit consumers to order items. In some embodiments, payment cards, such as credit or debit cards that include a magnetic stripe on which the relevant account number and/or other information is stored, could be used to pay for purchases if the touch screen tables can recognize the cards and accept payment. In addition, "proximity payment cards" or "contactless payment cards" have been developed that include a radio frequency identification (RFID) integrated circuit (IC), often referred to as a "chip" embedded in the card body. A suitable antenna is also embedded in the card body and is connected to the RFID chip to allow the chip to receive data and to transmit data by RF communication via the antenna. In typical arrangements, the RFID chip is powered from an interrogation signal that is transmitted by a proximity reader and received by the card antenna. MasterCard International Incorporated, the assignee hereof, has established a widely-used standard, known as "PayPass®", for interoperability of contactless payment cards and proximity readers. Thus, in some implementations, the account number of the proximity payment card is automatically read from the card by radio frequency (RF) communication between the payment card and the proximity reader, which device is conventionally incorporated with a Point-of-Sale (POS) terminal. In addition, in some payment application implementations, a Near Field Communication (NFC) protocol can be utilized to wirelessly exchange information.

The capabilities of a contactless payment card have also been incorporated into portable or mobile devices, thereby turning such mobile devices into contactless payment devices. For example, mobile telephones, personal digital assistants (PDAs), tablet computers, laptop computers, and the like can be equipped with integrated circuitry having the same functionality as the RFID IC of a contactless payment card. In some embodiments, such payment-enabled mobile devices and/or contactless payment devices include a loop antenna coupled to the payment-related IC for use in sending and/or receiving messages in connection with a purchase transaction that involves contactless payment.

The inventors recognized that there is a need for providing systems, apparatus and methods which may include a user interface to facilitate and enhance the use of touch screen technology for contactless payment transactions and/or for other types of transactions.

BRIEF DESCRIPTION OF THE DRAWINGS

Features and advantages of some embodiments, and the manner in which the same are accomplished, will become more readily apparent with reference to the following detailed description taken in conjunction with the accompanying drawings, which illustrate exemplary embodiments (not necessarily drawn to scale), wherein.

DETAILED DESCRIPTION

In general, and for the purpose of introducing concepts of novel embodiments described herein, described are systems, apparatus and methods to facilitate operation of a touch screen system by consumers using proximity payment devices to pay for items. In an embodiment, the method includes detecting the presence of at least two proximity payment devices on a touchable surface of a touch screen, and then displaying on the touch screen a payment option menu for each of at least two consumers associated with the at least two proximity payment devices. The consumers then select pay indications and associated payment amounts. At least one proximity reader then reads payment account data from the proximity payment devices and provides the payment account data to a processor, which transmits the payment account data and the payment amounts to a payment server computer.

In some embodiments, the processor displays a payment option menu in separate payment areas of the touch screen, and the payment amounts can be adjusted by each consumer so as to apportion a total amount that is due. In addition, in some implementations the processor receives at least one payment authorization message associated with at least one of the proximity payment devices, and then displays the payment message(s) in at least one payment area to confirm acceptance of a payment.

Thus, consumers are able to interact with a touch screen display that may include a user interface that enables two or more consumers to utilize multiple proximity payment cards associated with different payment card accounts to pay for ordered items and/or services. Consumers may also designate conditions and/or criteria to associate with each of the payment card accounts for a particular purchase transaction. Such operation enhances the speed and convenience of purchase transactions that involve the use of a touch screen and one or more proximity payment cards and/or contactless payment-enabled mobile telephones and/or other payment-enabled portable devices. In addition, in some embodiments a consumer associated with a single proximity payment device may interact with the touch screen display to make a payment or payments for goods and/or services that have been ordered by one or more consumers, if desired.

Figure 1:
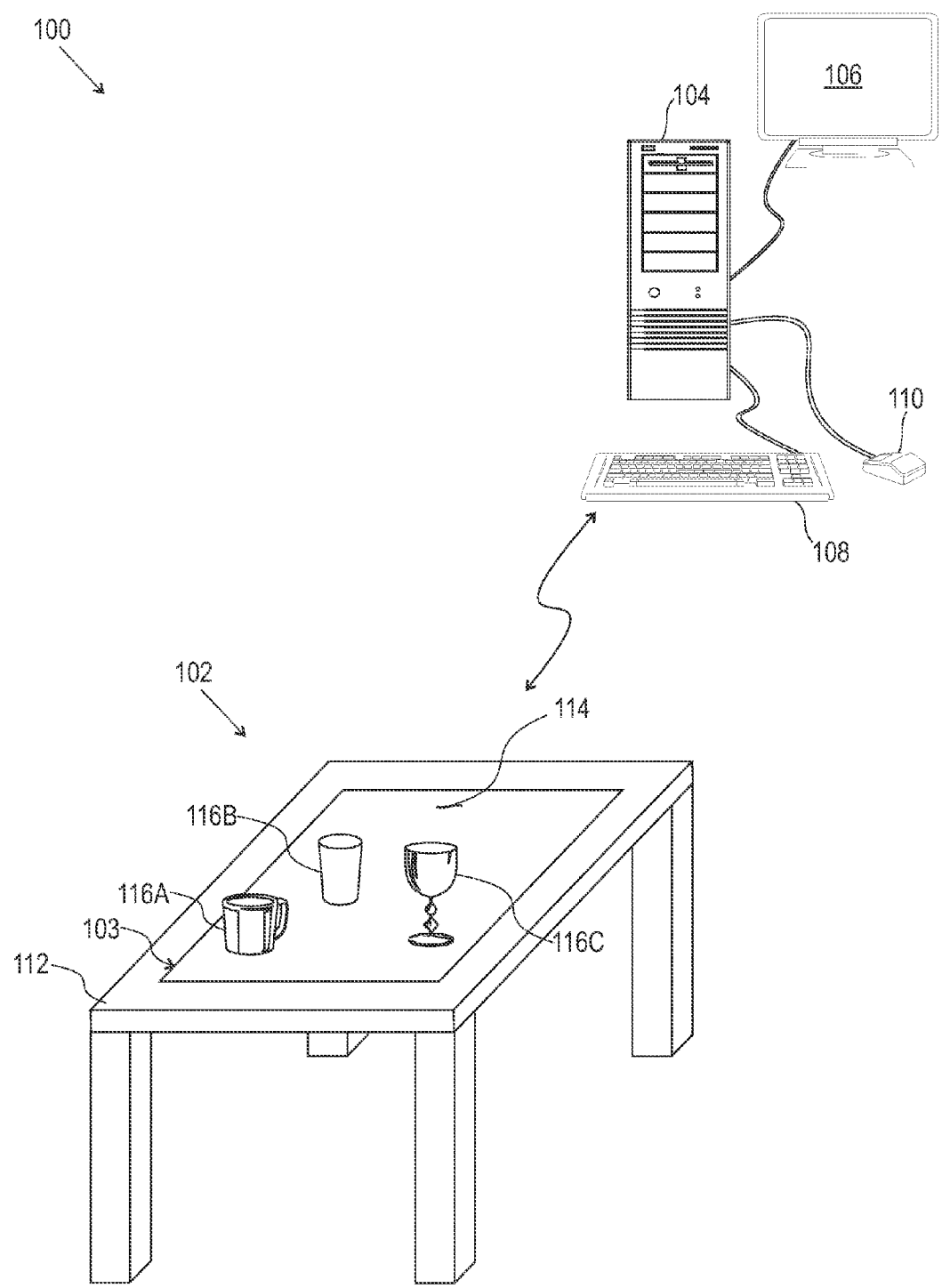
FIG. 1 illustrates an interactive display system integrated with a table that includes a touch panel system according to an embodiment of the invention.

FIG. 1 illustrates an embodiment of an interactive display system 100 that includes a touch panel system 102 incorporated into a table 112, wherein the touch screen system 102 may be configured for wireless communications with a computer 104. The computer 104 may include input devices such as a monitor 106, a keyboard 108 and a computer mouse 110, or any other suitable user interface(s). The touch panel system 102 includes a relatively thin panel touch screen 103 which is shown as part of a horizontal flat surface that serves as the top of a table 112. It should be understood, however, that the touch screen could be utilized in other orientations such as vertically, for example, when hung on a wall. The touch panel system 102 thus includes the touch screen 103 having a horizontal touchable surface 114. In an implementation, the table 112 including the touch screen is provided for use by customers of a restaurant, bar or tavern which serves food and drinks, for example. Thus, the touch screen 103 may be operable to function as a display to show graphic images, such as a menu and/or photographs of food items and the like, and configured to allow consumers to select or order food and/or drink items by touching menu selection icons, for example, displayed on the touchable surface 114. The computer 104 is configured to provide processing power that enables a rich user interactive experience and is shown as wirelessly communicating with the touch panel system 102 for ease of understanding. However, in some embodiments, one or more suitable processors and/or storage devices may be integrated with the touch panel system 102, and may be housed, for example, underneath the horizontal touchable surface 114.

In some embodiments, the touch panel system 102 may also be configured to offer one or more games or other diversions for engaging customers who have ordered menu items such as drinks and/or food and who are awaiting arrival of those items. The touch panel system may also be configured to show drawings, illustrations and/or photographs on the display 103, for example, of memorabilia associated with a theme restaurant or bar such as sports items, antiques and/or rock and roll music-related items (which may depend on a theme associated with the bar and/or restaurant). A waiter may deliver the items ordered by one or more customers, such as beverages (for example, soda, wine and beer), and place them on the touchable surface 114. The touch screen system 102 is operable to recognize and detect the locations of each glass or container holding the beverages. The touch screen system may also be configured to keep track of the prices associated with each beverage and/or food item placed on the touchable surface 114.

In some embodiments, infrared (IR) sources (not shown in FIG. 1) within the touch panel system 102 function to illuminate objects such as beer mug 116A, cup 116B and wine glass 116C, which have been placed on the touchable surface 114. Infrared radiation reflected from the bottom surfaces of the objects 116A to 116C may be detected by IR sensors (not shown in FIG. 1) that are integrated into the touch panel system 102, and signals from the IR sensors are transmitted to, and processed by, the computer 104 to identify the locations of the objects 116A to 116C on touchable surface 114. Any suitable method for distinguishing between the different objects on the touchable surface 114 may be used. For example, the objects 116A to 116C may each have distinct shapes (such as different size and/or shaped cup bases) or may have symbols such as bar codes imprinted on the bottom (undersides) that contact the touchable surface 114 and that may be read and interpreted.

In an embodiment, the touch screen system 102 includes a plurality of retro-reflective opto-sensors which operate in the infrared part of the light spectrum (not shown). Such opto-sensors include an IR emitter and an optically isolated IR light sensor and thus are capable of both emitting IR light, and at the same time, detecting the intensity of incident light. In such a system, if a reflective object is placed in front of the sensing element, some of the emitted light will be reflected back and thus the object will be detected.

Figure 2:
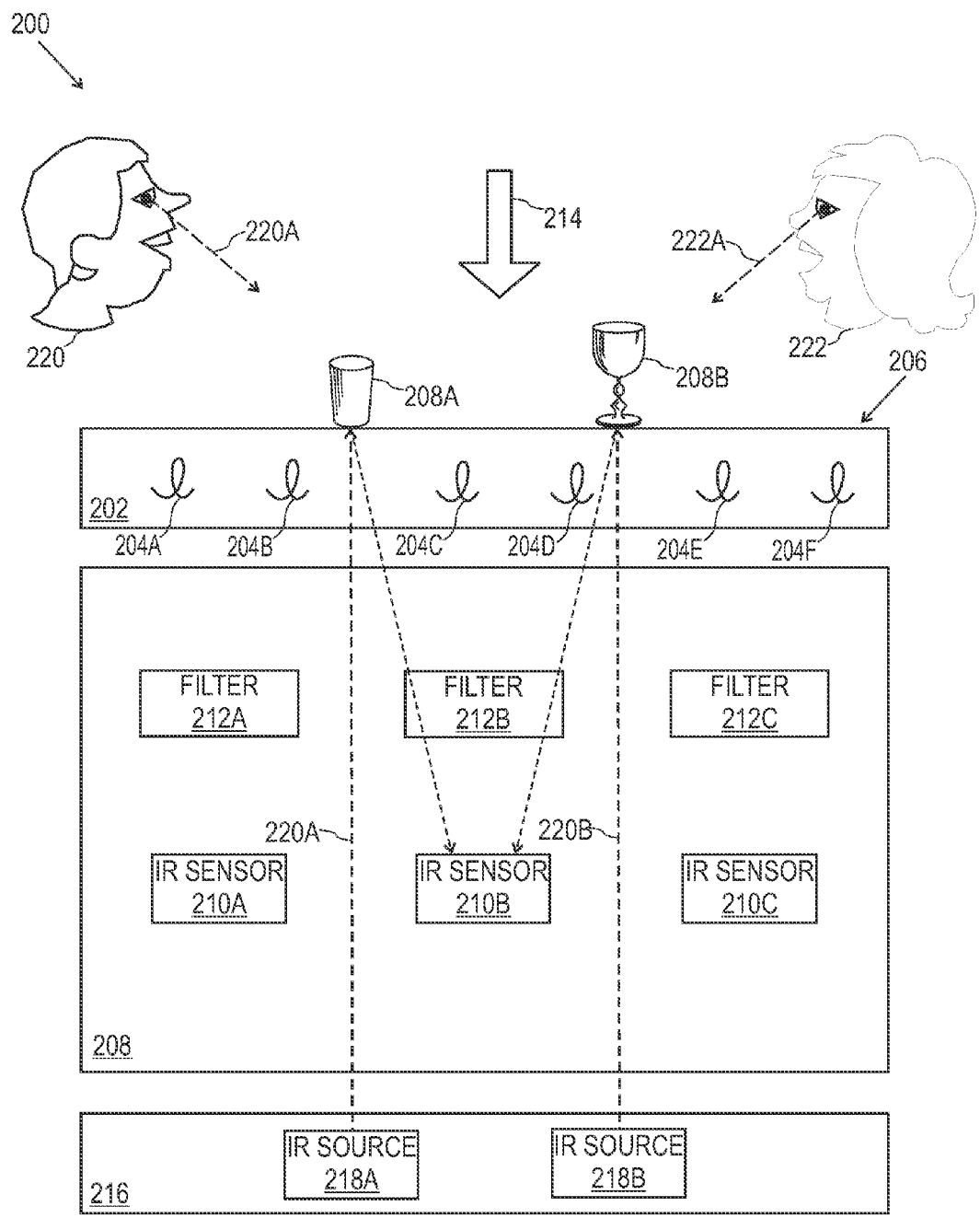
FIG. 2 is a block diagram illustrating a cross-section of a touch panel system in accordance with the embodiment of FIG. 1.

FIG. 2 is a block diagram (not drawn to scale) of a cross-section of an example of a touch screen system 200 to illustrate various functional layers and components in accordance with an embodiment. The touch screen system 200 includes a horizontally-oriented top layer 202 that includes an array of overlapping antennas 204A to 204F (which may be two-turn coils) which, in some embodiments, can be configured to provide communications coverage for the entire surface area of a touchable surface 206. Six such coils are depicted for ease of understanding, but more or less could be utilized depending on various considerations such as the size of the touch screen (to provide adequate surface area coverage). Such coils may be transparent conductor coils so as not to interfere with and/or block infrared (IR) radiation and/or visible light during operation of the touch screen display. It should also be understood that, in some embodiments, the antennas or coils may be located only in certain designated payment areas or locations of the top layer 202 of the touch screen system 200 (which may be labeled or otherwise designated, for example as "payment hotspots" in two or more corners of the touchable surface 206). The separate payment hotspots may be located, for example, in the corner portions of the touch screen and/or situated apart from one another, and may be situated to avoid interfering with and/or blocking IR radiation and/or visible light during operation of the touch screen display. The antennas and/or coils also may be integrated within the top layer 202 so as to be located very close to the surface or up to a few centimeters below the touchable surface 206. In some embodiments, the antenna may take the form of a single coil around the periphery of the touchable surface 206. Thus, the antenna or antennas are positioned and configured for communication with payment-enabled proximity devices, such as proximity payment cards and/or payment-enabled mobile devices. Moreover, the antenna or antennas are configured for multiple simultaneous radio-frequency identification (RFID)-based communications so as to be able to detect signals from, and transmit signals to, two or more proximity payment devices to facilitate purchase transactions conducted by consumers using the touchable surface 206 of the touch screen system 200.

Referring again to FIG. 2, a sensor layer 208 is located below the top layer 202 and includes a plurality of infrared (IR) sensors 210A, 210B and 210C and integrated filters 212A, 212B and 212C. Three such sensors and integrated filters are shown for ease of understanding, but in some embodiments, more of such IR sensors 204A to 204C and filters 212A to 212C can be distributed throughout the sensor layer 208 and parallel to the touchable surface 206. The filters 212A, 212B and 212C may be configured to absorb visible light and to transmit infrared radiation, and are positioned between the touchable surface 206 and the IR sensors 210A, 210B and 210C. Thus, in the case where the IR sensors 210A-210C are sensitive to a broader range of wavelengths of light other than purely infrared wavelengths, the filters 212A to 212C shield the IR sensors 210A-210C from any visible light (depicted as arrow 214) that may be incident on the touchable surface 206. The touch screen system also includes a backlight layer 216 having one or more IR sources 218A and 218B configured to illuminate objects that are in contact with, or are adjacent to, the touchable surface 206. In particular, the IR sources 218A and 218B provide infrared radiation in an upward direction, as indicated by dotted-line arrows 220A and 220B, and the IR light passes through the touchable surface 206 to illuminate objects in contact therewith.

In a touch screen display table configuration, consumers 220 and 222 may be sitting in chairs (not shown) situated around the table housing the touch screen system 200. In such cases, the consumers 220 and 222 are positioned such that their eyes are above the touch screen 206 so that they can view the touchable surface and see any objects situated thereon from above, as indicated by dotted-line arrows 220A and 2222A. In some embodiments, the display of the touch screen system 200 is configured to display images that are viewable by looking at the touchable surface 206. For example, the display may be, for example, an LCD, an organic light emitting diode (OLED) display, a flexible display such as electronic paper, or any other suitable display.

In the example shown in FIG. 2, a cup or glass 208A and a wine glass 208B are shown resting on the touchable surface 206. IR sources 218A and 218B illuminate the bottom portions of the cup 208A and a wine glass 208B with infrared light (see arrows 220A and 220B), and the reflected IR radiation (see arrows 224A and 224B) passes through the filter 212B onto the IR sensor 210B. The output of the IR sensor 210B (and the outputs of the other IR sensors) may be processed to identify a detected infrared image from one or more objects placed on the touchable surface 206. For example, the IR radiation reflected downwards from the bottom portion of the cup 208A and from the bottom of the wine glass 208B may represent the respective sizes and/or shapes of the base of the cup and/or wine glass and be processed to identify them. Once the cup and/or wine glass is identified, the system may then determine the associated cost of such drink menu items. In some embodiments, objects that may be placed on the touchable surface may include reflective ink patterns or metal designs on their bottom portions, or may include any other type of suitable reflector that can be recognized, identified, and/or processed. For example, white paper reflects IR radiation and black ink absorbs IR radiation, so a conventional bar code on the bottom surface of an object may be detected by an infrared-sensing device according to the described technology. Fingers are estimated to reflect about 10% of the near IR spectrum, which is sufficient to detect that a finger or hand is located at a particular location on or adjacent to the touchable surface 206. In some embodiments, a higher resolution of IR sensors may be utilized to scan objects and/or to handle applications such as document scanning and fingerprint recognition. In a particular example, in order to conduct accurate fingerprint recognition a resolution of more than 200 dots per inch (dpi) may be required. Moreover, in some embodiments, the IR sensors 210A-210C are only sensitive to radiation incident from above, so any IR radiation traveling directly from the backlight layer 216 in an upwards directions that may happen to fall on any of the IR sensors 210A-210C is not detected.

In some embodiments, each antenna 204A to 204F is connected to an RF multiplexer (which will be discussed with regard to FIG. 3 below). In some implementations, one or more RF multiplexers are utilized, and each such multiplexer is connected to a near field communications (NFC) reader (shown in FIG. 3) for transmitting data and for receiving payment information. For example, a payment circuit (not shown) in a proximity payment card or mobile telephone may be designed and/or programmed to operate in accordance with the above-mentioned PayPass® standard. Accordingly, the payment circuit of the proximity payment device is configured to respond to an interrogation signal from an NFC reader by transmitting payment account information such as a payment card account number (PAN) or other identifying data. Thus, the RF reader may transmit an interrogation signal via one or more of the antenna 204A to 204F when a proximity payment device is detected as having been placed on or nearby the touchable surface 206, and/or when a customer indicates (for example, by touching an icon or button on the touchable surface) that he or she wishes to provide payment. The RF reader transmits an interrogation signal and then listens for a response signal and/or message from the RFID circuitry of the proximity payment device (not shown), and may then operate in accordance with a conventional standard for short distance RF communication, such as the NFC standard.

For some applications, such as for a payment application, it may be desirable to detect an object such as a purchased item and/or a proximity payment device if it is nearby or in actual contact with the touchable surface 206 of the touch panel system 200. In addition, in some embodiments the IR sources 218A and 218B of the touch screen system 200 may be turned on or operational only if an object is in contact with the touchable surface 206, although in other embodiments the IR sources may be operational regardless of whether the touchable surface is touched. Detecting contact and/or the position of objects in contact with the touchable surface 206 may involve the IR capabilities described above associated with the output(s) of the IR sensor(s), or by utilizing any suitable means or apparatus. For example, in some embodiments contact between the touchable screen surface 206 and objects may be detected by a vibration sensor or microphone coupled to the touch screen, or by a camera (not shown) positioned above the touch screen that may use Computer Vision techniques to recognize objects and their positions. In addition, a capacitive contact may be attached to the front and/or back of a payment instrument such that when the payment instrument is placed on a capacitive touch screen the system is able to recognize the presence of the payment instrument. Other types of sensors and/or sensor arrangements may be utilized to detect contact and/or the position of objects on a touch screen such as, for example, pressure-based mechanisms, micro-machined accelerometers, piezoelectric devices, capacitive sensors, resistive sensors, inductive sensors, laser vibrometers, and LED vibrometers.

It should be understood that the touch panel system 200 of FIG. 2 illustrates just one example of a touch panel system. For example, in some embodiments the backlight 216 may not comprise any IR sources and the touch panel may include a frontlight that includes at least one IR source. In such an example, the touchable surface of the system is a surface of the frontlight. The frontlight may include a light guide, so that IR radiation emitted from the IR source travels through the light guide and is directed towards the touchable surface and any objects in contact with it. In some other embodiments of touch panel systems, both the backlight and frontlight may comprise IR sources. In yet other embodiments, a backlight is not utilized and the frontlight comprises both IR sources and visible light sources. In some further embodiments, the system may not include a frontlight or a backlight because the IR sources may be integrated within the touch panel. In an implementation, the touch panel may include an Organic Light Emitting Diode (OLED) display which includes IR OLED emitters and IR-sensitive organic photosensors (which may comprise reverse-biased OLEDs). In addition, although the touchable surface 206 of FIG. 2 is depicted as horizontal (as it is configured as a table top), it should be understood that the orientation of the touch screen system 200 is irrelevant with regard to functionality. For example, in a different embodiment the touchable surface 206 may be rotated clockwise by ninety degrees (90°) so that it is in a vertical orientation (for example, if it is hung on a wall). In such a vertical orientation, the objects from which reflected IR radiation is detected are to the side of the touchable surface 206 instead of above it. Thus, when the term "above" is used herein, it is intended to be applicable to all such orientations of the touchable surface.

Figure 3:
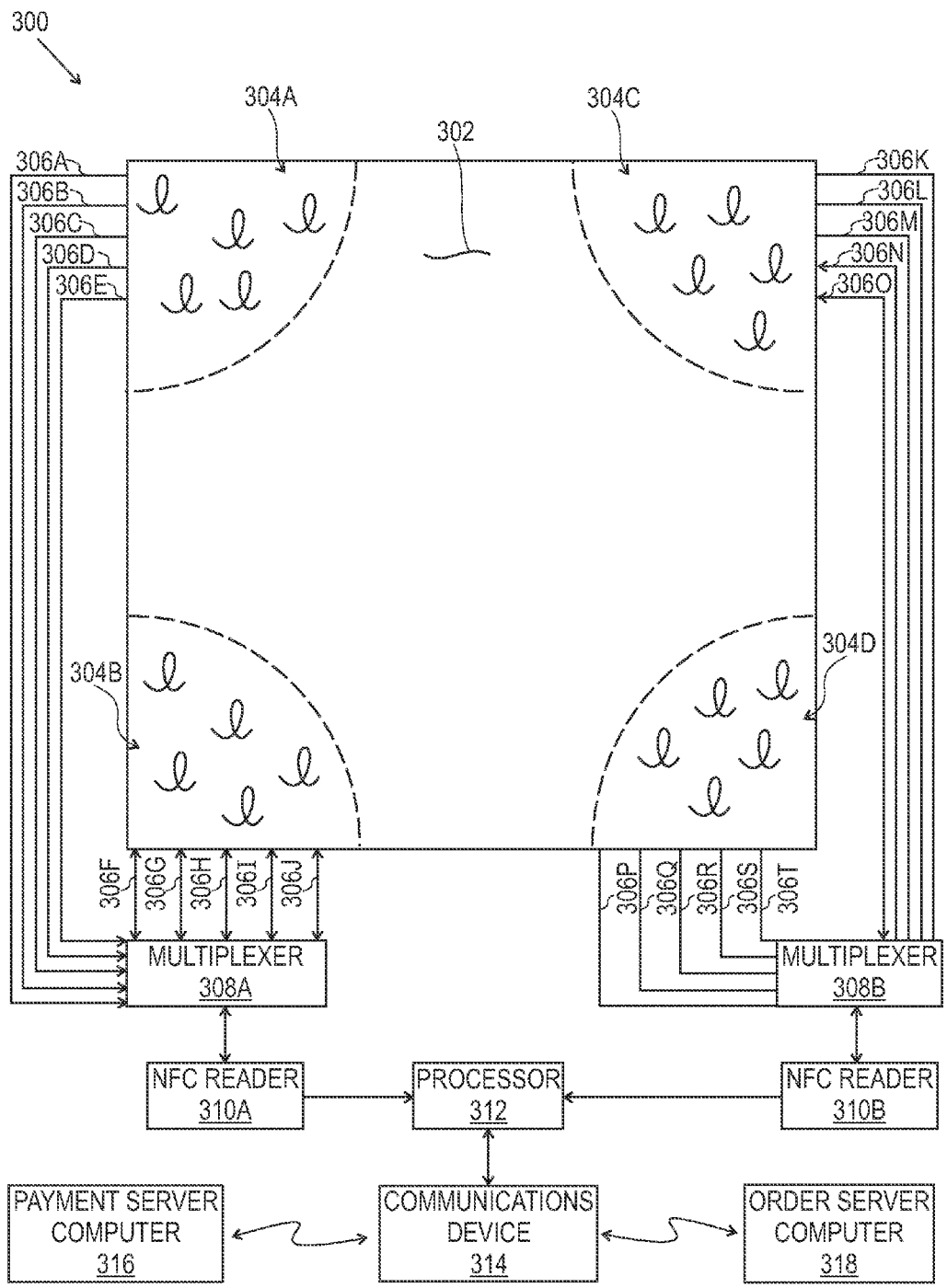
FIG. 3 is a block diagram illustrating a multiple-payment touch panel subsystem having components that may be integrated with the devices shown in FIGS. 1 and 2 according to an embodiment of the invention.

FIG. 3 is a block diagram of a top view illustrating a multiple-payment touch panel subsystem 300 according to an embodiment, including components which may be integrated with the components discussed above with regard to FIGS. 1 and 2. In some embodiments, as depicted by the top view of a touchable surface 302, four payment areas or "payment hotspots" 304A, 304B, 304C and 304D are available, which are demarcated by dotted lines in each of the four corners of the touch screen display. For ease of understanding, five antenna coils are depicted in each payment area and are operable to transmit interrogation signals and to receive signals from proximity payment devices. It should be understood that the example implementation shown in FIG. 3, which includes the four payment areas that each have five coils, is a simplified embodiment and thus that other embodiments are contemplated that could include more or less payment areas (including use of the entire surface area of the touchable surface 302) and more or less antennas or antenna arrays.

Referring again to FIG. 3, each of the antenna coils in the payment area 304A is connected to a multiplexer 308A via connections 306A to 306E. Likewise, each of the antenna coils in the payment area 304B is connected to the multiplexer 308A via connections 306 F to 306J. The multiplexer 308A is connected to an NFC Reader 310A. Similarly, each of the antenna coils in the payment areas 304C and 304D are connected to a multiplexer 308B via connection lines 306K to 306O and 306P to 306T, respectively. The multiplexer 308B is connected to an NFC Reader 310B. Both of the NFC Readers 310A and 310B are connected to a processor 312, which is operably connected to a communications device 314. In the embodiment of FIG. 3, the processor 312 of the multiple-payment touch panel subsystem 300 is configured for wireless communication via the communications device 314 with a payments server computer 316 and with an order server computer 318. Thus, the subsystem 300 is operable to transmit information to, and receive information from, the payment server computer 316.

In some embodiments, all of the components depicted in FIG. 3, including the antennas, multiplexers, NFC readers, the processor and the communications device, are integrated within a touch panel system (such as the touch panel system 200 of FIG. 2) and thus housed within, for example, a touch screen table. The components operate together to provide proximity payment functionality. It some embodiments, the processor 312 also receives data indicative of items that customers wish to order and is configured to transmit that product order information to an order server computer 318. The order server computer 318 may be located, for example in a back office of a bar or restaurant, and may be operable to wirelessly receive and provide information and/or data to appropriate staff of the bar or restaurant so that the items ordered by consumers will be delivered to the consumers at their table, for example.

It should be understood that more or less multiplexers could be utilized, and more or less NFC readers could be utilized, which may depend on considerations such as the cost and complexity of the configuration. For example, it may be that signal processing speed and accuracy takes precedence over other considerations, such as power constraints, and thus that many more antenna arrays are utilized in some embodiments. The use of more antenna arrays may require an increase in the number of multiplexers required to cover each of the potential areas on the touchable surface that can be utilized by consumers to place proximity payment devices, which may also result in using three or more NFC readers to provide substantially simultaneous reading of a number of proximity payment devices instead of the two shown in FIG. 3. Thus, the costs for developing and providing such a touch screen system to restaurant and/or bar owners, for example, may rise in concert with the complexity and/or increase in components required to provide desired functionality.

Figure 4A:
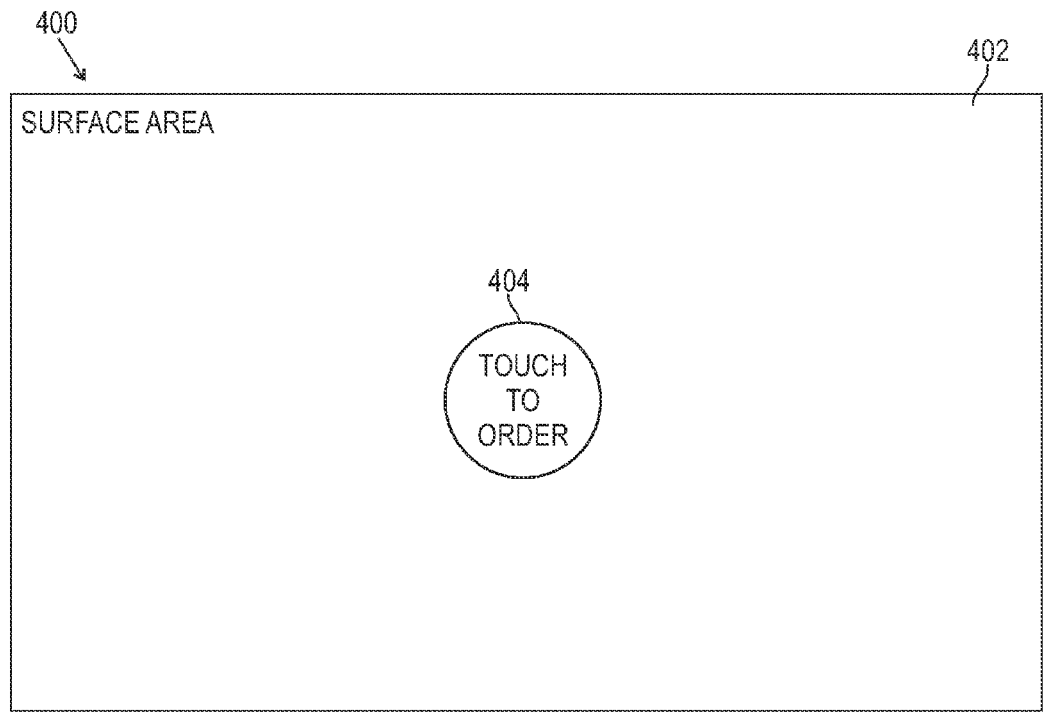
FIGS. 4A to 4F are top view, schematic diagrams of a touch screen table surface illustrating a user interface that may be provided to consumers for use to perform payment purchase transactions according to an embodiment of the invention.
Figure 4B:
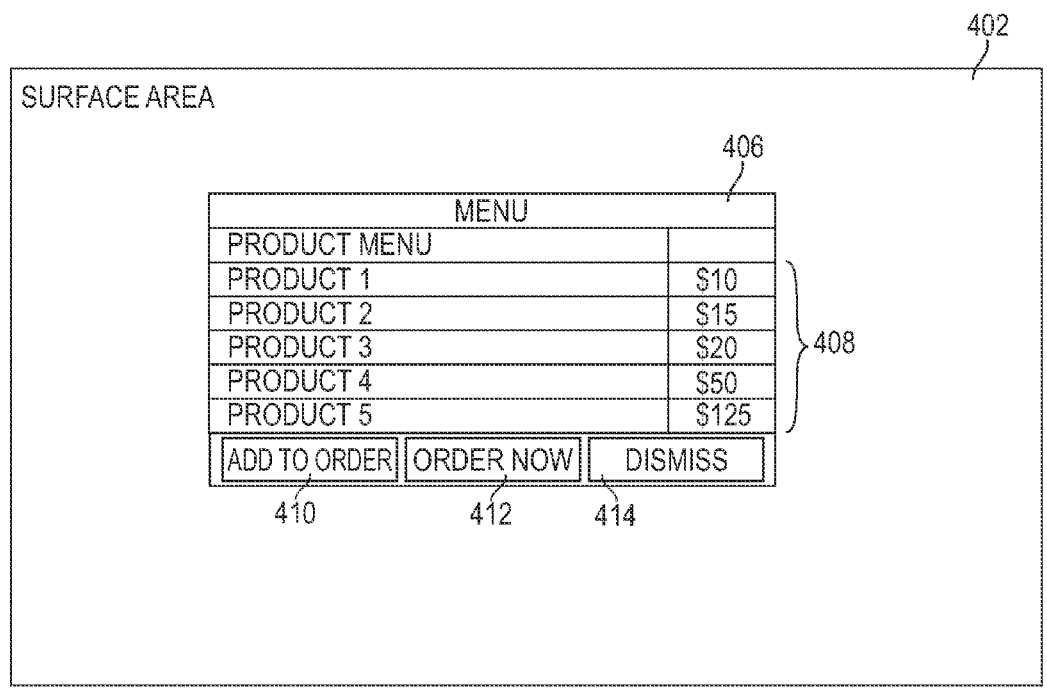

FIGS. 4A to 4F are top view, schematic diagrams of a touch screen table touchable surface 402 to illustrate embodiments of a user interface that may be provided to consumers for use to perform payment transactions by utilizing a touch screen system of the type described above with regard to FIGS. 1-3. In particular, FIG. 4A is a top view of a touchable surface 402 of a table touch panel display screen 400 depicting a launch screen having a "touch to order" icon 404 displayed in the approximate center of the touch screen. When a customer touches the icon 404, the launch screen of FIG. 4A is replaced with the menu screen 406 shown in FIG. 4B. The product menu 406 includes a list of products 408 and their associated prices. In the example shown in FIG. 4B, Product 1 costs ten dollars, Product 2 costs fifteen dollars, Product 3 costs twenty dollars, Product 4 costs fifty dollars, and Product 5 costs one hundred and twenty-five dollars. Also appearing on the menu page of FIG. 4B are an "Add to Order" button 410, "Order Now" button 412 and "Dismiss" button 414 that may be selected by a consumer. To place an order, one or more consumers touches one or more of the product items 408 (which may change color, or be underlined, or otherwise indicate a selection) in the product menu 406, and then presses on one of the buttons 410, 412 and 414, depending on whether or not the consumer desires to place an order, add to an order, or dismiss the menu. For example, a customer selects Product 5 and presses the "Order Now" button 412. In such a case, a processor 312 (see FIG. 3) transmits the order to an order server computer 318 which then processes the order to determine, for example, to transmit the order to a display device in a kitchen or bar service area of a restaurant for preparation and delivery of the item(s) by the kitchen staff and/or bar staff and/or waiter staff of the restaurant. The order server computer 318 and/or the processor 312 may also be configured to store a running total of items and their cost with regard to the customers at a particular touch screen table for purchase settlement purposes.

Figure 4C:
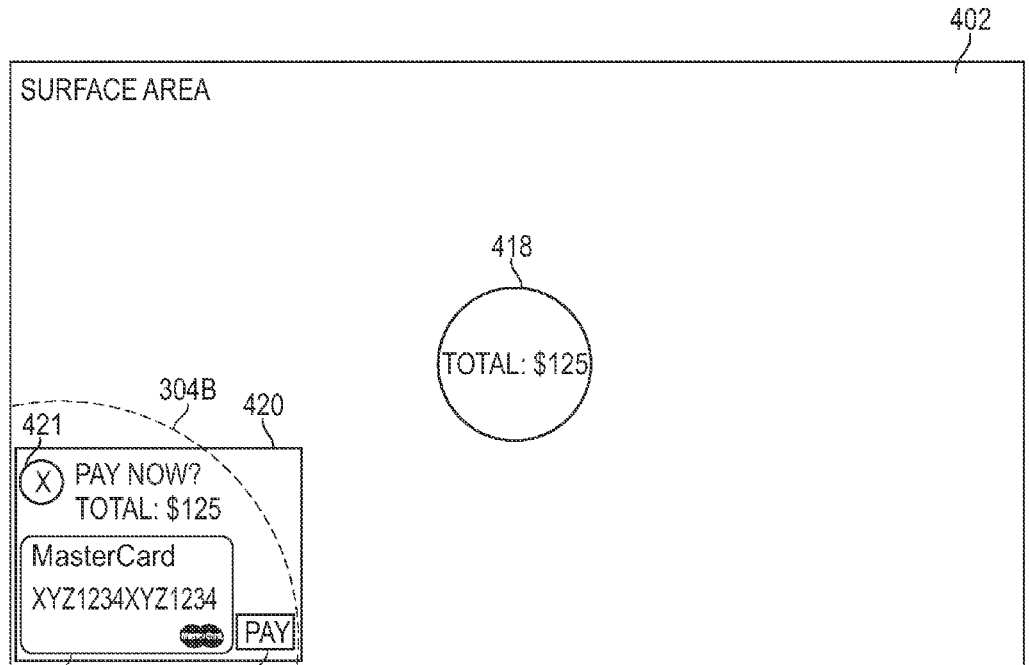

In some embodiments, when a consumer wishes to pay for his or her purchase (which in the current example may be after receiving and/or consuming the product or products), as shown in FIG. 4C the customer places her proximity payment card 416 on payment area 304B of the touchable surface 402. As explained above, in some embodiments, the touch screen system senses that an item has been placed on the touchable surface 402 in the payment area and identifies it as a proximity payment device. Thus, a total amount icon 418 appears in the approximate center of the touchable surface 402 of the touch screen display, along with a payment box 420 that may include an image 416 of the customer's payment card (or that may surround the actual payment card which is still resting on the touchable surface). A "Pay Now?" query also appears in the payment box 420. If the customer does not wish to pay at that time (perhaps he or she wishes to order more products, or wishes to pay with a different proximity payment device), he or she touches the "X" icon 421 in the upper left hand corner of payment box 420, which causes it to disappear. Otherwise, the customer presses a "Pay" icon 422 to proceed with payment processing.

Figure 4D:
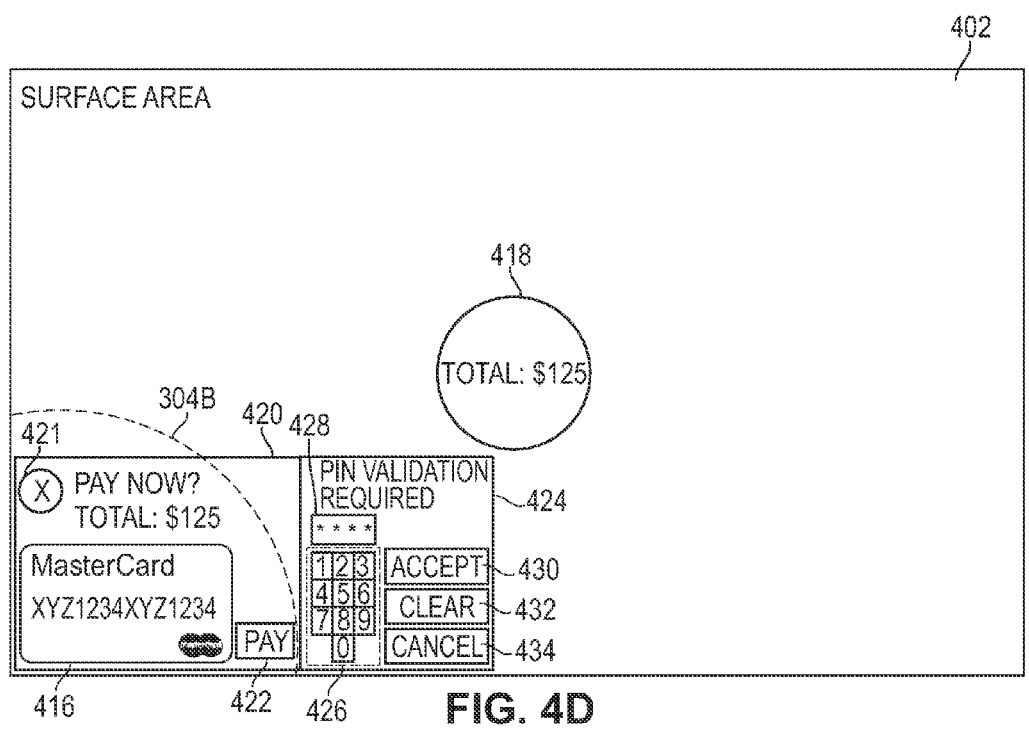
Figure 4E:
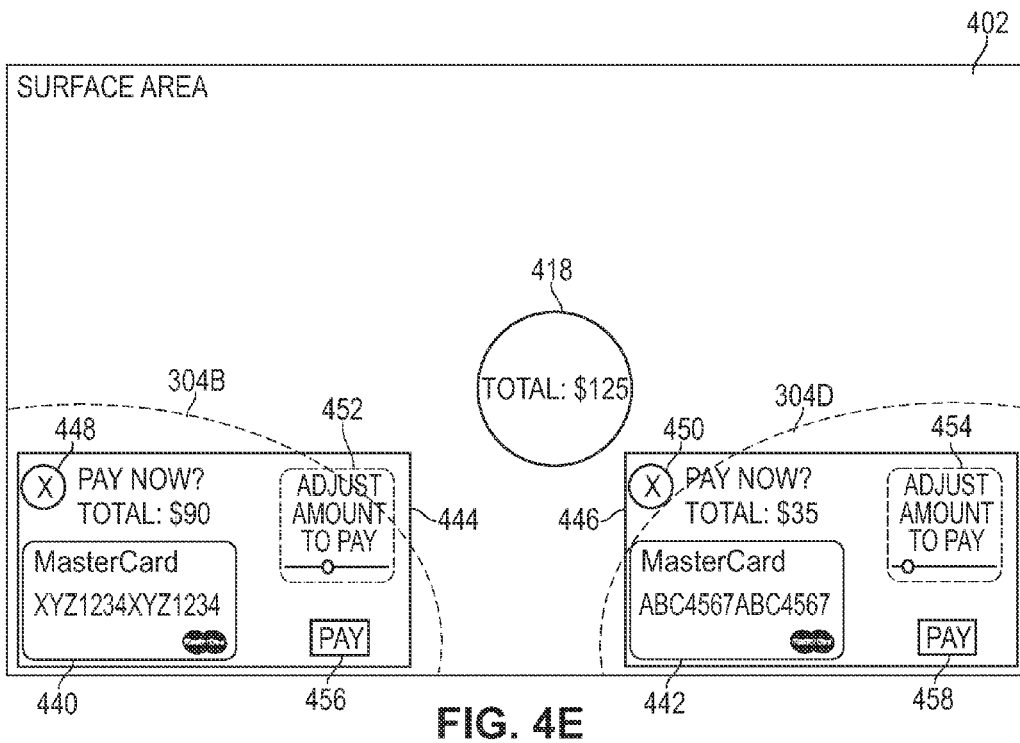

In the case where the customer wishes to pay for his or her order and pressed the "Pay" icon 422 of FIG. 4C, in some embodiments a personal identification number (PIN) validation box 424 is then displayed as shown in FIG. 4D. The consumer utilizes a keypad 426 to enter her PIN. In some implementations, the PIN may be shown as it is entered within display box 428 (or the PIN numbers may be displayed only momentarily so the customer can verify that a correct number key was selected as the PIN is being entered, and then that number is quickly replaced with an asterisk (as shown) to aid in keeping the PIN confidential). Icons or buttons labeled "Accept" 430, "Clear" 432 and "Cancel" 434 may also be provided for the customer to utilize when he or she is finished entering the PIN (Accept), or wishes to reenter or retry entry of the PIN (Clear), or has decided not to pay with that proximity payment device (Cancel). In some embodiments, after the PIN has been entered and the customer presses the "Accept" button 430, an NFC reader obtains the PIN and other payment account information from the proximity payment card 416 via the antenna array resident in the payment area 304B. This information is then forwarded to processor 312 (see FIG. 3), which then transmits, via the communication device 314, the proximity payment card account information including the PIN to a payment server computer 316, which in turn transmits the payment information to a payment network (not shown) for processing. If all is in order and the payment is authorized, the processor may receive a payment authorization message and then display a message on the touch screen display 402 for the customer to read. For example, the touch screen display may display a message that states: "Thank you for your payment. Your MasterCard account number XYZ1234 has been charged the amount of $125 dollars. An E-mail receipt has been transmitted to your Gmail account on file." The message may also contain other information, for example, that loyalty points have been earned and/or increased, and/or present an offer for further items or merchandise, and/or present a discount offer for the immediate purchase of an additional item or items.

In cases where several customers wish to split the cost of products or items that have been ordered (for example, where the customers are friends and have each ordered drink items at a restaurant or bar), the customers place their proximity payment devices in two or more of the payment areas 304A to 304D of the touchable surface 402. For example, in FIG. 4E a first customer placed a first proximity payment card 440 in the payment area 304B and a second customer placed a second proximity payment card 442 in the payment area 304D on touchable surface 402. The touch screen system senses or otherwise detects that two items have been placed on the touchable surface 402 and identifies both of them as proximity payment devices. A total amount icon 418 then appears in the approximate center of the touchable surface 402 of the touch screen display, along with a first payment box 444 and a second payment box 446 that each surrounds the customers' payment cards as shown. (As mentioned above, in some embodiments the first proximity payment card 440 and second proximity payment card 442 may be representations (pictures) of the payment cards of the consumers instead of the actual payment devices, which appear after each customer initiates payment.) In this example, the total amount due for payment is one hundred and twenty five ($125) dollars. Both payment boxes 444, 446 include a "Pay Now?" icon prompt, and both payment boxes also include "X" icons 448 and 450. The "X" icons 448 and 450 may be selected if one or both customers do not wish to pay at that time (perhaps one or both customers wish to order more products, or wish to pay with a different proximity payment device).

If the customers wish to pay at that time, in some embodiments both customers press the "Pay Now" icons at about the same time, and/or utilize the payment adjustment sliders 452 and 454 to adjust the amount of money he or she is willing to pay of the total amount. If only one customer has pressed the "Pay" button, in some embodiments the system prompts the other customer(s) to also provide an indication of their intention(s). In the example shown in FIG. 4E, the first customer selected an amount of $90 to pay (which amount appears above the proximity payment card image 440) and the second customer has an amount of $35 selected (which amount appears above the proximity payment card image 442). These amounts can be adjusted by one or both customers using their fingers, for example, to move the small circle across the adjustable payment line (from the left to the right to increase an amount, or from left to right to decrease the amount). In some embodiments, the sliders are "associated" to each other so that the sum of their amounts must equal the total payment amount due.

Figure 4F:
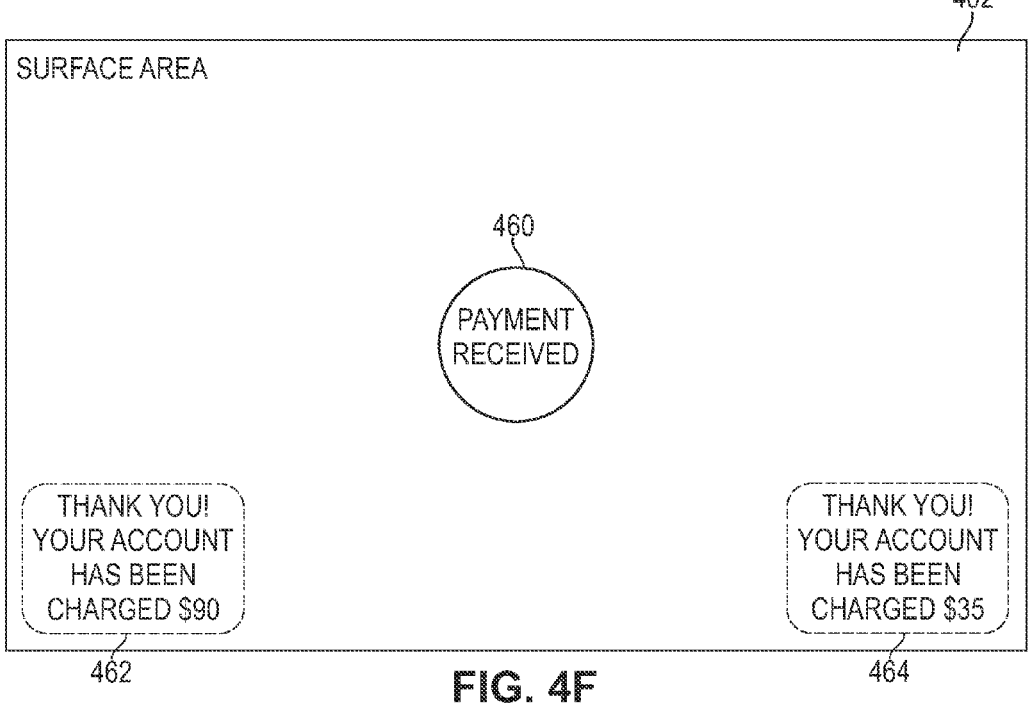

When the amounts have been apportioned, the consumers press their respective "Pay" buttons 456 and 458 to begin payment processing. A PIN may be required of one or both customers, in which case processing may progress as explained above, wherein one or more key pads may appear (not shown) for entry of the PIN by the customers so that further processing can occur. If all is in order and the payments are both authorized, the touch panel system processor may receive payment authorization messages and then display such messages on the touch screen display for both customers to read, as shown in FIG. 4F. In particular, the touch screen display may display a "Payment Received" message 460 in the center of the display screen, and a first message 462 that states: "Thank you! Your account has been charged the amount of $90 dollars" for the first customer; and a second message 464 that states: "Thank you! Your account has been charged the amount of $35 dollars" for the second customer. An E-mail receipt may also be transmitted to each customer utilizing email accounts that have been placed on file by the payment card account holder (the consumers), and/or other messages and/or information and/or offers could also be displayed.

It should be understood that, in some cases, a single consumer utilizing a single proximity payment device may wish to pay the tab (or total amount due) for all items ordered by an entire table of consumers, for example. In such a case, with reference to FIG. 4E that single consumer may place his or her payment device in either payment area 304B or 304D (which are payment hotspots) and use an associated payment adjustment slider 452 or 454 to adjust the amount of money to the full or total amount. The single consumer would then press one of the "Pay" buttons 456 and 458 to begin payment processing. As explained above, a PIN may be required, in which case processing may progress and a key pad may appear (not shown) for entry of the PIN by the consumer. If all is in order and the payment is authorized, the touch panel system processor may receive a payment authorization message and then display it on the touch screen, as explained above. An E-mail receipt may also be transmitted to the single consumer utilizing an e-mail account designated by that consumer, and/or other messages and/or information and/or offers could also be displayed.

It should be understood that the example representations shown in FIGS. 4A to 4F are for illustrative purposes only, and other steps and/or operations for presenting payment display screens and/or icons and/or buttons could be utilized and are contemplated to aid consumers in the purchase process. For example, in some embodiments, in addition to providing a total amount of money owed for purchased products or items, a list of such items included in the purchase and their corresponding cost (dollar amounts) may also be displayed. For example, a list of all drinks ordered by one or more consumers during a particular time period by utilizing the menu(s) provided at a particular touch panel table may be displayed on the touchable surface 402 along with the cost of each item. In this scenario, the list of drinks may be configured so that one or more consumers may be able to select or slide or swipe a listed drink to his or her payment area so that a tally can be kept of the amount of money that each consumer owes for those drinks. The price sub-totals may be automatically calculated by the touch panel system processor for each consumer, to facilitate fair apportionment of the amount owed to each consumer. In addition, an option to provide an additional fee for tipping the waiter or bartender may be provided. Before payment processing continues, each consumer may be prompted to acknowledge that the amount of money apportioned to a particular payment card account is correct by pressing an "Ok" button or icon or the like.

In some embodiments, a restaurant owner, for example, may require that the consumer be pre-authorized before permitting the customer to order items through use of the touch screen system. In particular, in such circumstances each consumer wishing to purchase items would need to present a proximity payment device and to provide authorization for the restaurant owner, for example, to charge a predetermined payment amount to be used as collateral for future purchases of items to a financial account of the consumer. The predetermined amount may be a nominal fee such as twenty-dollars, and/or the consumer may be presented with a menu listing various amounts such as ten dollars, twenty dollars, fifty dollars, and the like, that he or she may select as an up-front authorized charge that the restaurant owner may utilize. In such embodiments, the consumers may have already provided a personal identification number (PIN) during the pre-authorization process and thus, when the consumers wish to pay for items that have been purchased, processing may occur in a manner similar to that described above with regard to FIGS. 4A to 4F except that a PIN validation step (described above with regard to FIG. 4D) may not be required. In addition, if a total dollar amount of items purchased at a particular touch screen table is about to exceed or has exceeded the authorized charge amount, the customer(s) may be prompted to authorize an additional charge amount(s) before being allowed to place additional orders for drinks and or food items, for example.

Figure 5A:
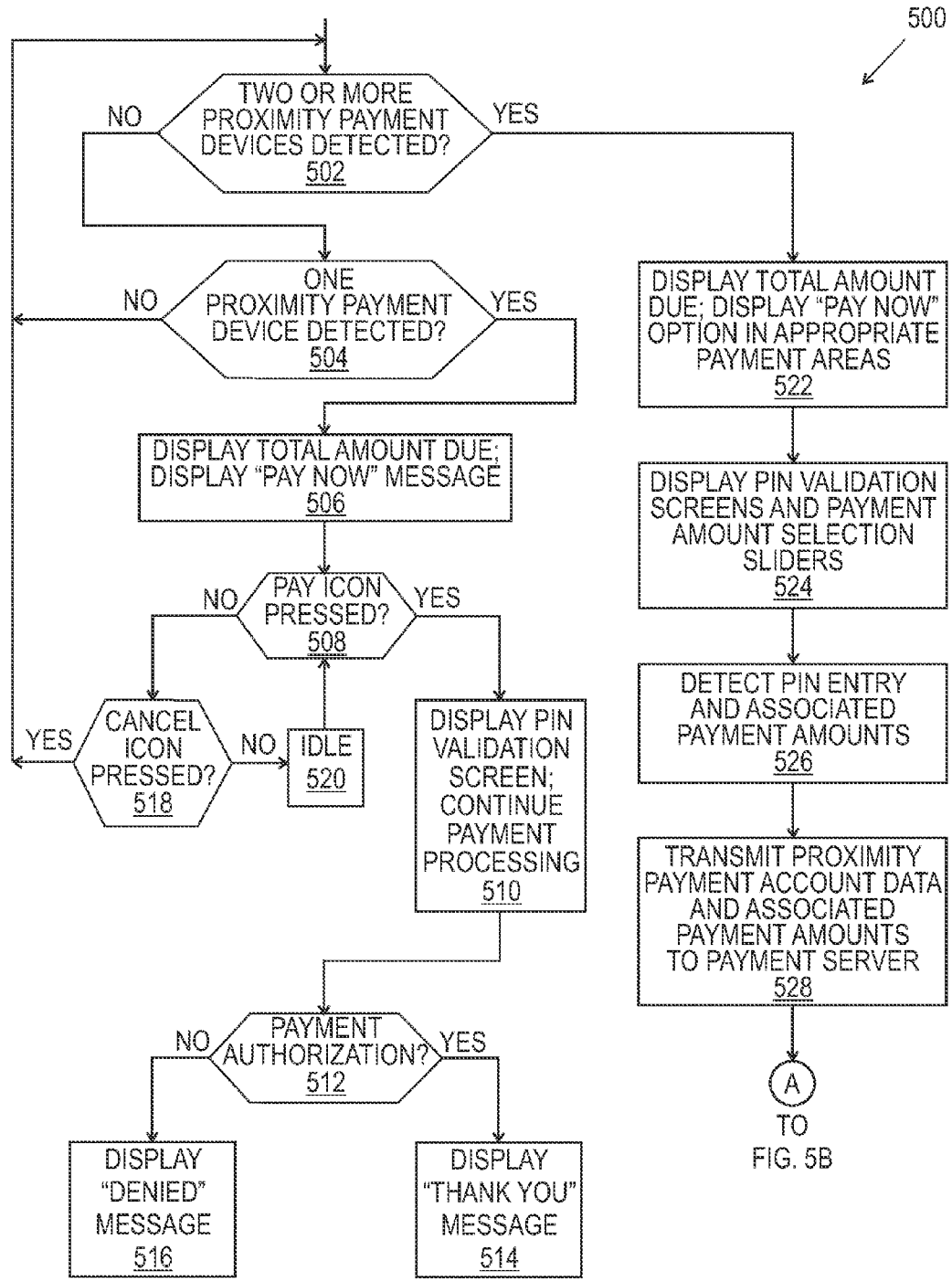
FIGS. 5A and 5B together form a flowchart illustrating a proximity payment device process that can be utilized with a touch panel system of the type shown in FIGS. 1 to 3 according to an embodiment of the invention.
Figure 5B:
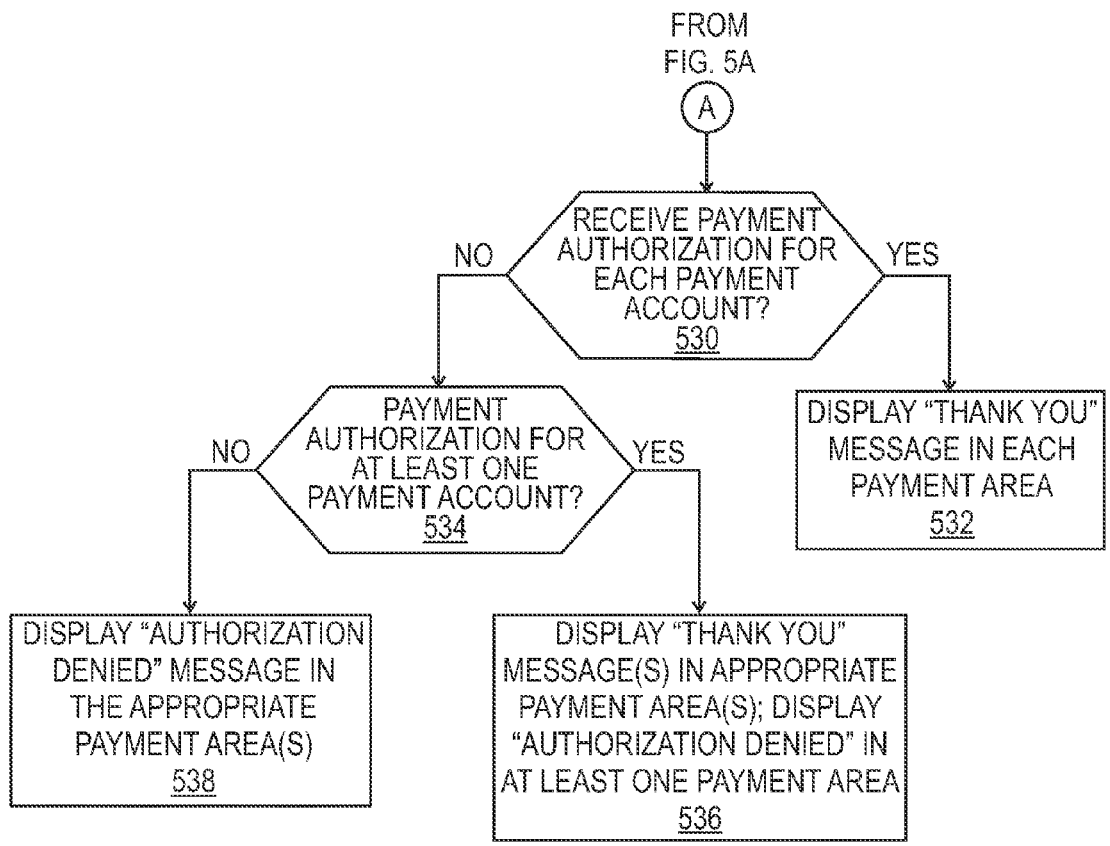

FIGS. 5A and 5B together form a flowchart illustrating a proximity payment device process 500 that can be utilized with a touch screen system that includes the components described above with regard to FIGS. 1 to 3 according to an embodiment. The processor 312 of the touch panel system first determines 502 whether two or more proximity payment devices (such as proximity payment cards, payment enabled mobile telephones, and the like) have been tapped on the payment detection areas 304A to 304D of the touchable surface, or have been placed there by customers. If, however, the processor determines that a single device has been placed in one of the payment areas, then displayed 506 is a total amount due along with a "Pay Now" message on the touch screen. (In the case of where no proximity payment device has been detected, the process branches back to step 502.) If the processor next detects 508 that a "Pay" icon has been pressed, then a personal identification number (PIN) validation screen is displayed 510 and payment account processing continues. Next, if a payment authorization is received 512, the processor displays 514 a "Thank You" message in the appropriate payment area to notify the consumer that payment has been accepted. However, if in step 512 a payment authorization is not received, then the processor displays 516 an "Authorization Denied" message to the consumer. In such a case, bar employees and/or restaurant staff may be notified in real-time so that they can assist the consumer (and/or insure that payment is made). In some embodiments, the processor may also display a message prompting the consumer to choose another form or payment and/or to go see the cashier and/or other restaurant employee.

Referring again to step 508, if the "Pay" icon has not been pressed, the processor may detect 518 selection of the "Cancel" icon. If so, then the process branches back to step 502; otherwise the process idles 520 for a predetermined period of time to give the consumer a chance to press the "Pay" or "Cancel" icons. After the predetermined idle time elapses, in some embodiments a message is displayed on the touch screen prompting the consumer to choose another form of payment or to select another option (such as ordering additional items from a menu).

If two or more consumers each provide a proximity payment device in separate payment areas on the touchable surface, then in step 502 the processor detects each of them. The processor then displays 522 a total amount due and a "Pay Now" icon or button in each of the appropriate payment areas. If one or more consumers presses the "Pay Now" icon then a PIN validation box appears (which may include a keypad) for use by the consumer to enter his or her payment account PIN. A payment amount slider or other means for the consumer to enter an amount may also be provided. The processor then detects 526 PIN entry and the associated payment amounts entered by the consumers, and transmits 528 the proximity payment account data and the associated payment amounts to a payment server.

Referring to FIG. 5B, if the processor receives 530 a payment authorization message for each of the consumer's payment card accounts, then displayed 532 is a "Thank You" message in each payment area. In some embodiments, the message may include a confirmation code and/or other information acknowledging receipt of payment. Referring again to step 530, if a payment authorization is not received for each payment account, but is received for at least one payment account, then displayed 536 is a "Thank You" message in the appropriate payment area(s) having payment authorizations. In some implementations, an "Authorization Denied" message is displayed in at least one payment area for consideration by those consumers whose proximity payment card accounts were not authorized for making the payments. In addition to such "Authorization Denied" messages, in some embodiments further information may be provided to the consumer(s). In addition, restaurant and/or bar staff may be notified as explained above. If in step 534 no payment authorizations have been received, then displayed 538 is an "Authorization Denied" message in each appropriate payment area. In addition to the "Authorization Denied" messages, in some embodiments further information may be provided to each consumer and restaurant and/or bar staff may be notified as explained above.

Figure 5C:
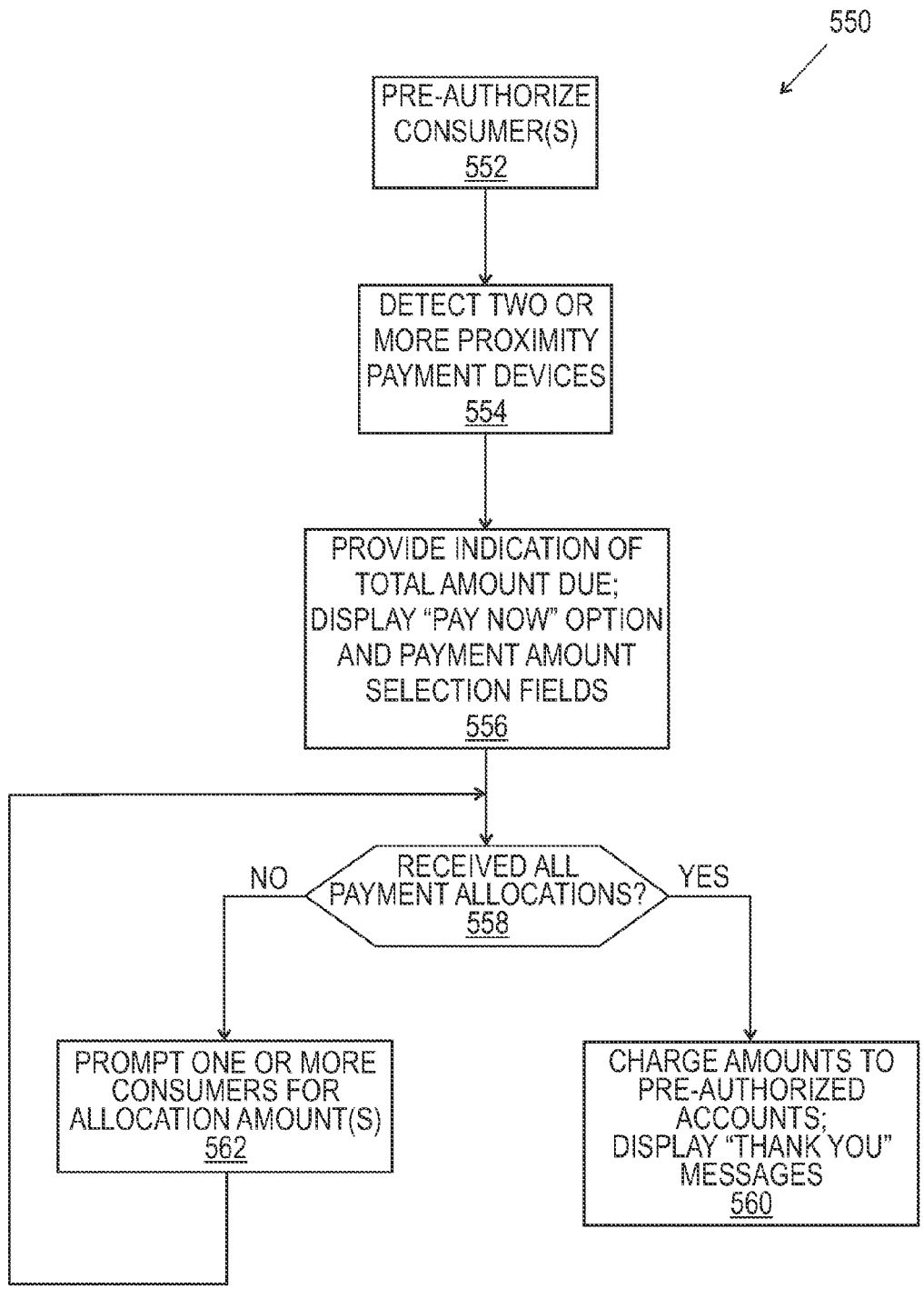
FIG. 5C is a flowchart illustrating a proximity payment device process in accordance with an embodiment of the invention.

FIG. 5C is a flowchart illustrating a proximity payment device process 550 in accordance with some embodiments that can be utilized with a touch screen system that includes the components described above with regard to FIGS. 1 to 3. In step 552, each of the consumers is pre-authorized which means that each consumer presents a proximity payment device on the touch screen surface which is read, and then each consumer is prompted to authorize an amount for purchased items that may be charged to each of their payment accounts. For example, a restaurant owner may require pre-authorization up to a predetermined amount of money before permitting the consumers to utilize the touch screen system, which amounts are use as collateral against future charges for food and/or drink items. Next, two or more proximity payment devices are detected 554, and an indication of the total amount due 556 is provided along with a "Pay Now" icon on the touch screen. A payment amount selection field is also provided to each consumer, which may include a payment slider 452 such as that shown in FIG. 4E, to enable each consumer to indicate the amount of money he or she is willing to spend towards the total amount that is due. If all the payment allocations are received 558, then the amounts are charged 560 to each of the pre-authorized payment accounts and a "Thank You" message is provided to each consumer. If all of the payment allocations are not received 558 within a predetermined time period from each other, then the processor touch screen system prompts 562 one or more consumers for an allocation amount. The process then eventually branches back to step 558 and at some point advances to step 560. Thus, in this embodiment, when the consumers wish to pay for purchased items the PIN validation step described above with regard to FIG. 4D is not be required (because each consumer is already pre-authorized). It should be understood that, in some embodiments, if a total dollar amount of items purchased at a particular touch screen table is about to exceed or has exceeded the authorized maximum payment amount (the sum of all of the authorized amounts), then the customer(s) may be prompted to authorize additional charge amounts before being allowed to place additional orders for drinks and/or food items, for example.

Figure 6:
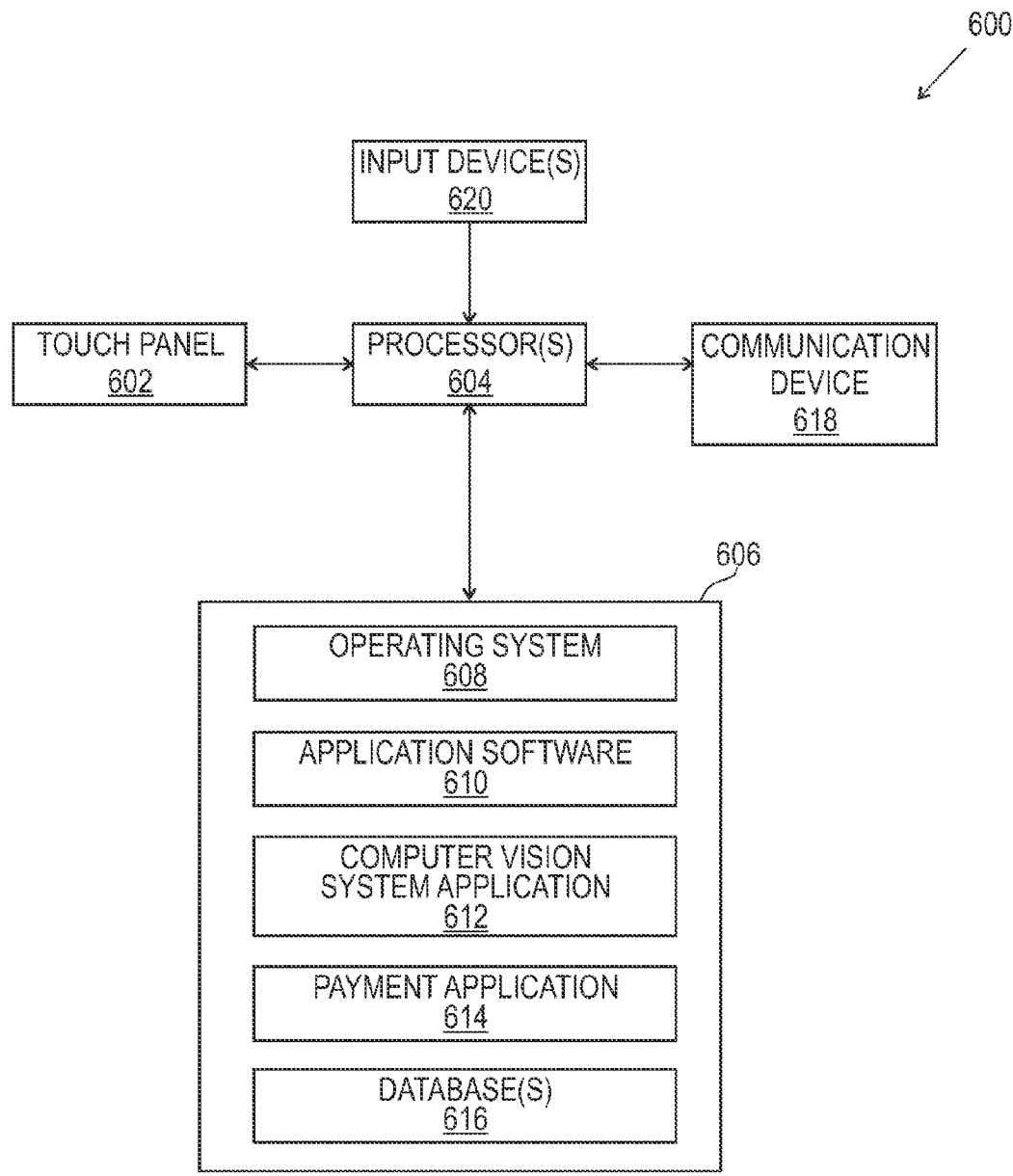
FIG. 6 illustrates various components of an exemplary computing-based device suitable for implementing the methods described herein for providing consumers with a touch screen user interface that allows multiple purchase transactions according to embodiments of the invention.

FIG. 6 illustrates various components of an exemplary computing-based device 600 that can be implemented as any form of a computing and/or electronic device, and in which embodiments of the methods and apparatus described above may be implemented. The computing-based device 600 includes a touch panel 602, for example as described above and shown in any of FIGS. 1-3, and one or more processors 604. The one or more processors may be microprocessors, controllers or any other suitable type of processors for processing computing executable instructions to control the operation of the device in order to detect multiple touch and/or pointing events and/or to transmit or receive data to/from a nearby device. Computer executable instructions may be provided using any computer-readable media, such as a storage device or memory 606 which may be of any suitable type such as random access memory (RAM), a disk storage device of any type such as a magnetic or optical storage device, a hard disk drive, or a CD, DVD or other disc drive. Flash memory, EPROM or EEPROM may also be used.

The storage device 606 may include an operating system 608, or any other suitable platform software may be provided to enable application software 610 to be executed on the device in accordance with the processes described herein. A computer vision system application 612 and a payment application 614 may also be provided. The storage device 606 may also include one or more database(s) 616 that store data, for example, relevant to purchase transaction processing.

The computing-based device 600 may also comprise a communication device 616 for wirelessly transmitting and receiving data, and one or more input devices 618. The communication device may be of a suitable type for receiving media content, Internet Protocol (IP) input, user instructions from a user input device etc, a communication interface and one or more outputs such as an audio output.

The IR-based examples described and illustrated herein have been provided as an example only and is not limiting. Those skilled in the art will appreciate that the described examples are suitable for application in a variety of different systems which may use different wavelengths of electromagnetic radiation (for example, visible light).

The term "computer" is used herein to refer to any device with processing capability such that it can execute instructions. Those skilled in the art will realize that such processing capabilities are incorporated into many different devices and therefore the term "computer" encompasses, for example, personal computers (PCs), server computers, laptop computers, tablet computers, mobile telephones (such as Smartphones), personal digital assistants and many other devices.

The methods described herein may be performed by software in machine readable form on a storage medium. The software can be suitable for execution on a parallel processor or a serial processor such that the method steps may be carried out in any suitable order and/or can be carried out simultaneously.

Those skilled in the art recognize that storage devices utilized to store program instructions can be distributed across a network. For example, a remote computer may store an example of the process described as software. A local or terminal computer may access the remote computer and download a part or all of the software to run the program. Alternatively, a local computer may download portions of the software as needed, or execute some software instructions at the local terminal and some at the remote computer (or computer network). Those skilled in the art will also recognize that by utilizing conventional techniques that all, or a portion of the software instructions may be carried out by a dedicated circuit, such as a digital signal processor (DSP), programmable logic array, or the like.

As the term "payment transaction" is used herein and in the appended claims, it should be understood to include the types of transactions commonly referred to as "purchase transactions" in connection with payment card systems and payment card accounts.

As used herein and in the appended claims, the term "initiating a transaction" includes a proximity payment device such as a payment-enabled mobile telephone or proximity payment card communicating a payment card account number (PAN) and/or additional payment information (for example, expiration date data) to a reader device which may be incorporated into a touch panel system as described herein.

The above descriptions and illustrations of processes herein should not be considered to imply a fixed order for performing the process steps. Rather, the process steps may be performed in any order that is practicable, including simultaneous performance of at least some steps.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method of operating an interactive touch screen system comprising:
   detecting, by a plurality of sensors embedded within a touch screen, the presence of a first proximity payment device in contact with a touchable surface in a first payment area of the touch screen and a second proximity payment device in contact with the touchable surface in a separate second payment area;
   receiving, by a touch panel processor, data from the plurality of embedded sensors concerning the first and second proximity payment devices;
   displaying, by the touch panel processor on the touch screen in an area separate from the first and second payment areas, a total amount due;
   simultaneously displaying, by the touch panel processor, a first payment option menu in the first payment area and a second payment option menu in the separate second payment area;
   detecting, by the touch panel processor, selection of a first pay indication from the first payment area associated with the first proximity payment device and a second pay indication from the second payment area associated with the second proximity payment device;
   receiving, by the touch panel processor, a first payment amount from the first payment area associated with the first proximity payment device and a second payment amount from the second payment area associated with the second proximity payment device, wherein a sum of the first and second payment amounts equal the total amount due;
   reading, by at least one proximity reader, payment account data from the first and second proximity payment devices;
   providing, by the at least one proximity reader, the payment account data to the touch panel processor;
   transmitting, by the touch panel processor, the payment account data comprising the first payment amount associated with the first proximity payment device and the second payment amount associated with the second proximity payment device to a payment server computer;
   receiving, by the touch panel processor from the payment server computer, a first payment authorization message associated with the first proximity payment device and a second payment authorization message associated with the second proximity payment device; and
   displaying, by the touch panel processor, the first payment authorization message in the first payment area and the second payment authorization message in the second separate payment area.

2. The method of claim 1, further comprising, subsequent to detecting selection of pay indications:
   providing, by the touch panel processor, a first and second personal identification number (PIN) entry screen in the first and second payment areas; and
   detecting entry of a first PIN in the first PIN entry screen and a second PIN in the second PIN entry screen.

3. The method of claim 2, further comprising transmitting, by the touch panel processor, the first PIN along with the payment account data associated with the first proximity payment device and the second PIN along with payment account data associated with the second proximity payment device to a payment server computer.

4. A non-transitory computer readable medium storing instructions configured to cause a touch panel processor to:
   receive an indication from a plurality of sensors of detection of a first proximity payment device in contact with a touchable surface of a touch screen in a first payment area and a second proximity payment device in contact with the touchable surface in a separate second payment area of the touch screen;

display on the touch screen in an area separate from the first and second payment areas, a total amount due;

simultaneously display a first payment option menu in the first payment area and a second payment option menu in the separate second payment area;

detect selection of a first pay indication from the first payment area associated with the first proximity payment device and a second pay indication from the second payment area associated with the second proximity payment device;

receive a first payment amount from the first payment area associated with the first proximity payment device and a second payment amount from the second payment area associated with the second proximity payment device, wherein a sum of the first and second payment amounts equal the total amount due;

receive payment account data from the first and second proximity payment devices;

transmit the payment account data comprising the first payment amount associated with the first proximity payment device and the second payment amount associated with the second proximity payment device to a payment server computer;

receive a first payment authorization message associated with the first proximity payment device and a second payment authorization message associated with the second proximity payment device from the payment server computer; and display the first payment authorization message in the first payment area and the second payment authorization message in the second separate payment area.

5. The non-transitory computer readable medium of claim 4, further comprising, subsequent to the instructions for detecting selection of pay indications, instructions configured to cause the touch panel processor to:

provide a first and second personal identification number (PIN) entry screen in the first and second payment areas; and detect entry of a first PIN in the first PIN entry screen and a second PIN in the second PIN entry screen.

6. The non-transitory computer readable medium of claim 5, further comprising instructions configured to cause the touch panel processor to transmit the first PIN along with the payment account data associated with the first proximity payment device and the second PIN along with payment account data associated with the second proximity payment device to a payment server computer.

7. An interactive touch screen system comprising:

a touch screen comprising a touchable surface and at least two embedded antenna arrays parallel to the touchable surface, the at least two embedded antenna arrays located in at least a first payment area and a separate second payment area and configured to read data from first proximity payment device and a second proximity payment device when present on the touchable surface;

at least one multiplexer operably connected to the at least two embedded antenna arrays;

at least one near field communications (NFC) reader operably connected to the at least one multiplexer; and a touch screen processor operably connected to the touch screen, to the at least two embedded antenna arrays, to the at least one NFC reader, and to a communications component, the touch screen processor configured to:

receive an indication from the at least two embedded antenna arrays of the presence of a first proximity payment device the first payment area and a second proximity payment device in the separate second payment area on the touchable surface;

display in an area separate from the first and second payment areas a total amount due;

simultaneously display a first payment option menu in the first payment area and a second payment option menu in the separate second payment area for each of the first and second proximity payment devices;

receive selection of a first pay indication from the first payment area associated with the first proximity payment device and a second pay indication from the second payment area associated with the second proximity payment device;

receive a first payment amount from the first payment area associated with the first proximity payment device and a second payment amount from the second payment area associated with the second proximity payment device, wherein a sum of the first and second payment amounts equal the total amount due;

transmit via the communications component payment card account data and the first and second payment amounts associated with the first and second proximity payment devices to a payment server computer;

receive a first payment authorization message associated with the first proximity payment device and a second payment authorization message associated with the second proximity payment device from the payment server computer; and display the first payment authorization message in the first payment area and the second payment authorization message in the second separate payment area.

8. The system of claim 7, further comprising a backlight below the touch screen comprising at least one light source configured to illuminate objects through the touchable surface.

9. The system of claim 7, further comprising a sensor layer below the touch screen for detecting objects contacting the touch screen surface, the sensor layer comprising a plurality of integrated infrared sensors and a plurality of integrated filters positioned between the touchable surface and the integrated sensors.

10. The system of claim 9, further comprising a light source layer below the sensor layer, the light source layer comprising at least one infrared light source.

* * * * *